(12) United States Patent
Feng et al.

(10) Patent No.: US 12,544,353 B2
(45) Date of Patent: Feb. 10, 2026

(54) APPLICATION OF GLYCEROL MONODECANOATE IN PREPARATION OF HYPOGLYCEMIC DRUG OR FUNCTIONAL FOOD

(71) Applicants: Hangzhou Kangyuan Food Technology Co., LTD, Zhejiang (CN); Hangzhou Longyu Biotechnology Co., LTD, Zhejiang (CN)

(72) Inventors: Fengqin Feng, Zhejiang (CN); Minjie Zhao, Zhejiang (CN); Junhui Zhang, Zhejiang (CN); Haiying Cai, Zhejiang (CN)

(73) Assignees: HANGZHOU KANGYUAN FOOD TECHNOLOGY CO., LTD., Zhejiang (CN); HANGZHOU LONGYU BIOTECHNOLOGY CO., LTD., Zhejiang (CN)

(*) Notice: Subject to any disclaimer, the term of this patent is extended or adjusted under 35 U.S.C. 154(b) by 0 days.

(21) Appl. No.: 19/205,979

(22) Filed: May 12, 2025

(65) Prior Publication Data
US 2026/0014113 A1    Jan. 15, 2026

(30) Foreign Application Priority Data
Jul. 12, 2024  (CN) .......................... 202410935514.X

(51) Int. Cl.
*A61K 31/25* (2006.01)
*A61P 3/10* (2006.01)

(52) U.S. Cl.
CPC ................ *A61K 31/25* (2013.01); *A61P 3/10* (2018.01)

(58) Field of Classification Search
CPC ...................................................... A61K 31/25
See application file for complete search history.

(56) References Cited

PUBLICATIONS

Echelon Bioscience.*
Zhang et al. Food & Function, 2022, 13:8804-8817.*
Dietary emulsifier glycerol monodecanoate affects the gut microbiota contributing to regulating lipid metabolism, insulin sensitivity and inflammation, Junhui Zhang and so on, Food Function, vol. 13, pp. 8804-8817, Dec. 31, 2022.

* cited by examiner

*Primary Examiner* — Rei Tsang Shiao
(74) *Attorney, Agent, or Firm* — Ming Jiang; OPENPTO US LLC

(57) ABSTRACT

Disclosed is an application of glycerol monodecanoate (GMD) in the preparation of a hypoglycemic drug or a functional food, falling within the technical field of medicine. According to the present disclosure, the hypoglycemic and insulin resistance-improving functions of GMD are first revealed. Studies demonstrate that GMD can enhance glucagon-like peptide-1 (GLP-1) secretion, activate hepatic glycolysis and insulin receptor (INSR)-related gene expression, while inhibiting hepatic gluconeogenesis pathway-related gene expression. Notably in type 2 diabetes mellitus (T2DM), glucose-lowering efficacy of GMD is comparable to metformin, and it outperforms metformin in regulating glucose tolerance and insulin tolerance, with significant alleviation of polydipsia. Moreover, as GMD is a naturally occurring edible substance with a high safety profile, it has a good application prospect in the preparation of a drug for treating hyperglycemia and diabetes, or a functional food to assist in lowering blood glucose.

5 Claims, 18 Drawing Sheets
Specification includes a Sequence Listing.

APPLICATION OF GLYCEROL MONODECANOATE IN PREPARATION OF HYPOGLYCEMIC DRUG OR FUNCTIONAL FOOD

CROSS-REFERENCE TO RELATED APPLICATION

This application claims priority of Chinese Patent Application No. 202410935514.X, filed on Jul. 12, 2024, the entire contents of which are incorporated herein by reference.

STATEMENT REGARDING SEQUENCE LISTING

The sequence listing associated with this application is submitted electronically in XML format as required by 37 CFR 1.831 (a). The sequence listing is incorporated by reference into the specification. The XML file named "U.S. Pat. No. 19,205,979 Sequence Listing.xml" is 8192 bytes in size, was created on Jan. 4, 2026, and contains no new matter. This file was submitted electronically via USPTO's EFS-Web.

TECHNICAL FIELD

The present disclosure relates to the technical field of medicine, and specifically to an application of glycerol monodecanoate (GMD) in the preparation of a hypoglycemic drug or a functional food.

BACKGROUND

Medium chain fatty acid monoglycerides are monoesters formed by medium chain fatty acids (MCFAs) with carbon chain lengths of 8-12 and glycerol. GMD, an esterification product of decanoic acid (C10) and glycerol, is naturally present in coconut oil, palm kernel oil, and camphor tree seed oil, with a chemical formula of $C_{13}H_{26}O_4$, and a molecular weight of 246.34. GMD serves industrial purposes as an emulsifier, surfactant, lubricant, and solvent. It is widely utilized in industries such as cosmetics, food, pharmaceuticals, and plastics.

Medium chain fatty acid monoglycerides have a strong inhibitory effect on common food spoilage microorganisms (including bacteria and fungi). The preservative properties are superior to those of general chemical preservatives, being safer, broader-spectrum and more efficient. Among them, glycerol monocaprylate (C8) and glycerol monolaurate (C12) are recognized as effective food emulsifiers and preservatives. Studies have shown that GMD exhibits notable antibacterial and antiviral activity, particularly demonstrating significant inhibitory effects against *Campylobacter*, *Salmonella*, and *Escherichia coli*.

MCFA, owing to unique chain-length properties, can be directly absorbed from the intestines into the portal vein and subsequently transported to the liver for metabolism, serving as solubilizers and absorption enhancers, thereby improving the oral bioavailability of drugs in vivo (*Medium chain fatty acid metabolism and energy expenditure: Obesity treatment implications*; DOI: 10.1016/S0024-3205 (97) 01143-0). In terms of nutritional metabolism, MCFAs are rapidly metabolized in vivo to generate energy, demonstrating potent regulatory effects on metabolic processes, which can increase energy expenditure and prevent metabolic syndrome. Medium chain fatty acid monoglycerides retain the inherent properties of MCFA, undergoing exceptionally rapid digestion, absorption, and metabolism within the body.

Studies have demonstrated that glyceryl monocaprylate (GMC) exerts beneficial effects in modulating gut microbiota composition, regulating inflammatory responses, and enhancing short-chain fatty acid (SCFA) production (Glycerol monocaprylate modulates gut microbiota and increases short-chain fatty acids production without adverse effects on metabolism and inflammation; DOI: 10.3390/nu13051427). Furthermore, glyceryl monolaurate (GML) has been evidenced to ameliorate systemic inflammation in high-fat diet (HFD)-fed mouse models (Gut microbiota patterns involved in the attenuation of dextran sodium sulfate-induced mouse colitis mediated by glycerol monolaurate via inducing anti-inflammatory responses; DOI: 10.1128/mBio.02148-21).

However, current research on GMD remains substantially limited. It is of practical value and significance to explore and exploit the nutrient metabolism regulation function of GMD.

SUMMARY

An objective of the present disclosure is to provide a food-grade substance with hypoglycemic efficacy and insulin resistance amelioration, for use in the preparation of drug targeting the treatment or adjuvant treatment of hyperglycemia, diabetes mellitus, and other related diseases, or the preparation of health food to assist in lowering blood glucose.

To realize the above objective, the present disclosure employs the following technical solutions.

The present disclosure provides an application of GMD in the preparation of a drug for treating hyperglycemia or diabetes mellitus, or a functional food to assist in lowering blood glucose.

The hyperglycemia refers to elevated blood glucose levels exceeding the normal physiological range, yet not meeting the diagnostic criteria for diabetes mellitus. Such conditions are collectively classified as impaired glucose tolerance (IGT). Experimental studies utilizing HFD-fed animal models simulating long-term hyperlipidemic conditions have conclusively demonstrated that GMD significantly enhances systemic glucose tolerance and ameliorates HFD-induced hyperglycemia. Notably, its therapeutic efficacy surpasses that of two other medium chain fatty acid monoglycerides: GMC and GML.

In a further description, the hyperglycemia is caused by either impairment of pancreatic β-cell function or development of insulin resistance.

In the present disclosure, in animal model experiments simulating type 2 diabetes mellitus (T2DM), it is found that GMD exhibits potent postprandial glucose-lowering efficacy, with the therapeutic effectiveness being comparable to the metformin, commonly used in hypoglycemic drug. In a further description, the diabetes mellitus refers to T2DM.

The manifestations of diabetes mellitus primarily include polydipsia. In the present disclosure, the study has indicated that GMD can significantly reduce water intake in diabetic mice, with an effect being distinct from that of metformin, demonstrating superior efficacy compared to GML.

In the present disclosure, the study demonstrates that after GMD intervention, the body's glucose tolerance and insulin tolerance can be improved in both HFD-induced animal models and type 2 diabetic animal models. In serum diagnosis, GMD can significantly reduce the body's blood glucose and insulin levels, with a significant increase in levels of glucagon-like peptide-1 (GLP-1), thereby enhancing insulin sensitivity and ameliorating insulin resistance.

Mechanistic studies have demonstrated that GMD lowers blood glucose levels by promoting hepatic glycolysis and inhibiting gluconeogenesis. Gene expression analysis reveals that GMD can reduce blood glucose levels by promoting the expression of glucokinase ((('K) and insulin receptor (INSR) genes in the hepatic glycolysis pathway, and inhibiting the expression of phosphoenolpyruvate carboxykinase (PEP ('K) and glucose-6-phosphatase catalytic subunit (G6PC) genes in the gluconeogenesis pathway.

As GMD is a naturally occurring edible substance with a high biosecurity, it holds promise for development into hypoglycemic drugs or functional foods to assist in lowering blood glucose. GMD provided by the present disclosure is also applicable for blood glucose regulation in individuals with long-term HFD consumption or obese populations.

Preferably, a pharmaceutical formulation is in the form of an oral dosage form. The specific dosage is adjusted based on the disease type, severity, age, and therapeutic objective.

In the present disclosure, GMD is used as an active ingredient in the preparation of corresponding hypoglycemic drug, which includes a pharmaceutically effective dose of GMD. Additionally, the drug may further contain suitable drug carriers.

Specifically, the present disclosure provides a pharmaceutical composition targeting the treatment or adjuvant treatment of hyperglycemia or diabetes mellitus, including an effective dose of GMD and pharmaceutically acceptable carriers.

The pharmaceutical composition includes GMD as the primary active ingredient, formulated with pharmaceutically acceptable carriers, and can be prepared into a formulation using preparation methods documented in pharmacy. The drug may be formulated into a liquid dosage form.

In the present disclosure, GMD is used as an active ingredient to prepare a corresponding functional food to assist in lowering blood glucose, and may also be incorporated as a food additive into edible products or beverages to enhance health benefits for consumers.

Specifically, the present disclosure provides the functional food to assist in lowering blood glucose, including GMD and food-grade excipients. The functional food may be formulated into dosage forms such as capsules.

Another objective of the present objective is to provide an application of GMD in the preparation of a GLP-1 agonist. GLP-1 can stimulate insulin secretion, enhance insulin sensitivity, inhibit glucagon secretion, delay gastric emptying and reduce appetite, thereby lowering blood glucose and body weight.

Term Explanation:

The term "including" is an open-ended expression, meaning it includes the content explicitly specified in the present disclosure but does not exclude other aspects.

The term "treating" (or "treatment"), in some examples, refers to ameliorating a disease or disorder (i.e., slowing, arresting, or reducing the development of the disease or at least one of its clinical symptoms). In other examples, it refers to alleviating or ameliorating at least one physical parameter, including those that may not be discernible to the subject. In further examples, it denotes modulating a disease or disorder physically (e.g., stabilizing discernible symptoms) or physiologically (e.g., stabilizing physiological parameters), or both. In additional examples, it signifies preventing or delaying the onset, progression, or exacerbation of a disease or disorder.

The term "effective dose" refers to an amount of a compound that, when administered to a subject to treat a disease, is sufficient to be effective in the treatment of such disease. The effective dose may vary depending on the severity of the disease, as well as the subject's physical condition, age, weight, gender, and other factors.

The term "pharmaceutically or food-grade acceptable carrier/excipient" refers to any formulation or carrier medium capable of delivering an effective dose of the active ingredient in the present disclosure, without interfering with its biological activity and exhibiting no toxicity or adverse side effects to the host or subject.

The present disclosure has the following beneficial effects.

In the present disclosure, the hypoglycemic and insulin resistance-improving functions of GMD are first revealed. In both long-term HFD simulations and type 2 diabetes models, GMD demonstrates significant blood glucose-lowering effects, which can remarkably ameliorate insulin resistance, enhance GLP-1 secretion, activate hepatic glycolysis and INSR-related gene expression, while inhibiting hepatic gluconeogenesis pathway-related gene expression. Notably in T2DM, glucose-lowering efficacy of GMD is comparable to metformin, and it outperforms metformin in regulating glucose tolerance and insulin tolerance, with significant alleviation of polydipsia and polyphagia. Moreover, as GMD is a naturally occurring edible substance with a high safety profile, it has a good application prospect in the preparation of drug for treating hyperglycemia and diabetes, or functional food to assist in lowering blood glucose.

DETAILED DESCRIPTION

The present disclosure is further described below in combination with specific examples. The following examples are intended merely to illustrate the present disclosure, rather than limiting the scope of application of the present disclosure. Without departing from the spirit and essence of the present disclosure, modifications or substitutions to the methods, steps or conditions of the present disclosure are within the scope of the present disclosure.

The experimental methods used in the following examples are standard methods unless otherwise specified. All materials and reagents, unless specially noted, are commercially available, including: GMD (CAS: 26402-22-2), GML (CAS: 40738-26-9), and GMC (CAS: 26402-26-6).

In the following examples, a normal diet composition (g/100 g diet) includes: 18.96% of casein, 0.28% of L-cystine, 29.86% of corn starch, 3.32% of maltodextrin, 33.17% of sucrose, 4.74% of cellulose, 2.37% of soybean oil, 1.90% of lard, 2.68% of mineral mixture, 1.56% of potassium citrate monohydrate, 0.95% of vitamin mixture, and 0.19% of choline bitartrate, yielding a total caloric value of 385 kcal/100 g diet. A HFD composition (g/100 g diet) includes: 23.31 of casein, 0.35 of l-cystine, 8.48 of corn starch, 11.65 of maltodextrin, 20.14 of sucrose, 5.83 of cellulose, 2.91 of soybean oil, 20.68 of lard, 3.31 of mineral mixture, 1.92 of potassium citrate monohydrate, 1.16 of vitamin mixture, and 0.23 of choline bitartrate.

Example 1: Effects of GMD on HFD-fed mice

1. Experimental Grouping

Thirty-six 4-week-old healthy male C57BL/6 mice (specific pathogen-free, SPF) from Shanghai Slack Laboratory Animal Co., Ltd. were selected as experimental subjects. After 2 weeks of pre-feeding adaptation, all mice were randomized into three experimental groups. Each group was housed in 3 cages with 4 mice per cage, and maintained for 16 weeks. Detailed groups are as follows:

In an NCD group: normal diet was fed with daily drinking freedom;

in an HFD group: HFD was fed with daily drinking freedom; and in a GMD group: high-fat GMD diet was fed (containing 1600 mg/kg GMD based on the above HFD) with daily drinking freedom.

2. Glucose Tolerance Test

At week 15, all mice underwent the glucose tolerance test: all mice were fasted for 12 hours prior to receiving an intraperitoneal injection of glucose solution with a dosage of 2 g/kg body weight. Blood glucose concentration of each mouse was measured using a glucometer at 0, 30, 60, 90, and 120 minutes, and blood glucose changing curves were plotted to calculate the AUC of blood glucose changes. The results were shown in FIG. 1.

Figure 1A:
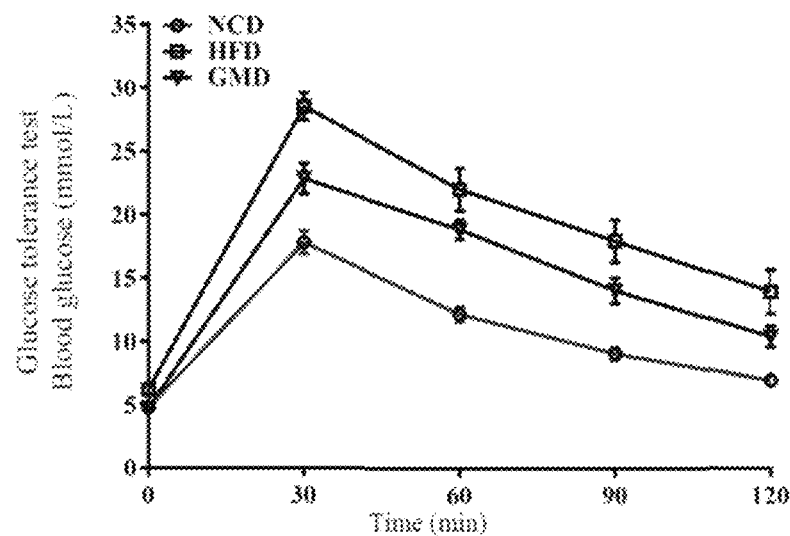
FIG. 1A shows blood glucose variation curves over 120 minutes following an intraperitoneal glucose injection in HFD-fed mice at the 15th week of feeding.
Figure 1B:
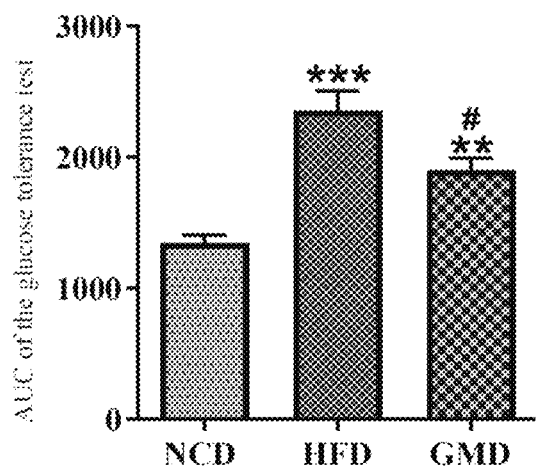
FIG. 1B shows the area under the curve (AUC) of blood glucose levels over 120 minutes following an intraperitoneal glucose injection in HFD-fed mice at the 15th week of feeding, and in this figure, * indicates statistical significance compared to a normal-chow diet (NCD) group, #denotes statistical significance compared to a HFD group,  corresponds to $p<0.01$, * corresponds to $p<0.001$, and #corresponds to $p<0.05$.
Figure 1C:
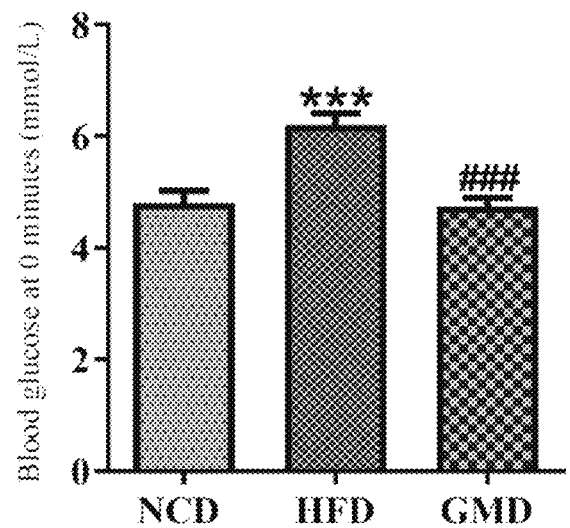
FIG. 1C shows blood glucose levels at 0 minutes prior to an intraperitoneal glucose injection in HFD-fed mice at the 15th week of feeding, and in this figure, * indicates statistical significance compared to the NCD group, #denotes statistical significance compared to the HFD group, *** corresponds to $p<0.001$, and ###corresponds to $p<0.001$.

As shown in FIG. 1A, after the intraperitoneal injection of glucose solution, blood glucose levels in all mice exhibit an increasing trend within 30 minutes, followed by a gradual decline over the subsequent 90 minutes. Throughout this period, the NCD group and the GMD group maintain blood glucose levels consistently lower than those in the HFD group. FIG. 1B and FIG. 1C demonstrate that the NCD and GMD groups show significantly lower values in both the AUC of the glucose tolerance test and baseline blood glucose levels at 0 minutes compared to the HFD group.

Hyperglycemia and insulin resistance are induced in mice due to long-term HFD. The glucose tolerance test results indicate that GMD can significantly improve the response and regulation of blood glucose in mice, and reduce hyperglycemia caused by HFD.

3. Serum Index Test

Mice were housed for 16 weeks. At the experimental endpoint, orbital blood sampling was performed to collect serum, followed by euthanasia. Liver tissues were subsequently harvested and snap-frozen for storage.

Serum blood glucose levels were measured using commercial assay kits from Nanjing Jiancheng Bioengineering Institute (China).

Serum insulin and GLP-1 levels were quantified using enzyme-linked immunosorbent assay (ELISA) kits form Wuhan Colorful Gene Biotech Co., LTD (China). GLP-1, an incretin hormone secreted by intestinal L cells, could suppresses appetite of organism, enhance insulin sensitivity and regulate blood glucose in vivo through interactions with multiple receptors in the body.

The insulin resistance index was calculated using the following formula: insulin level×blood glucose concentration/22.5.

The results are illustrated in FIG. 2. Compared to the NCD group, the HFD group demonstrates significantly elevated serum glucose levels, serum insulin levels, and insulin resistance index (FIGS. 2A, 2B, and 2C), concomitantly showing a marked reduction in GLP-1 levels (FIG. 2D). These results collectively confirm the successful establishment of a HFD-induced animal model exhibiting hyperglycemia and insulin resistance.

Figure 2A:
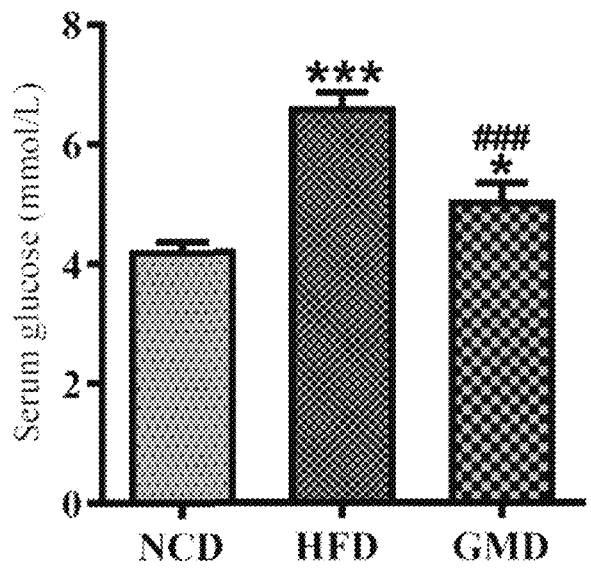
FIG. 2A shows serum glucose levels in HFD-fed mice after 16 weeks of feeding, and in this figure, * indicates statistical significance compared to the NCD group, #denotes statistical significance compared to the HFD group, * corresponds to $p<0.05$, *** corresponds to $p<0.001$, and ###corresponds to $p<0.001$.
Figure 2B:
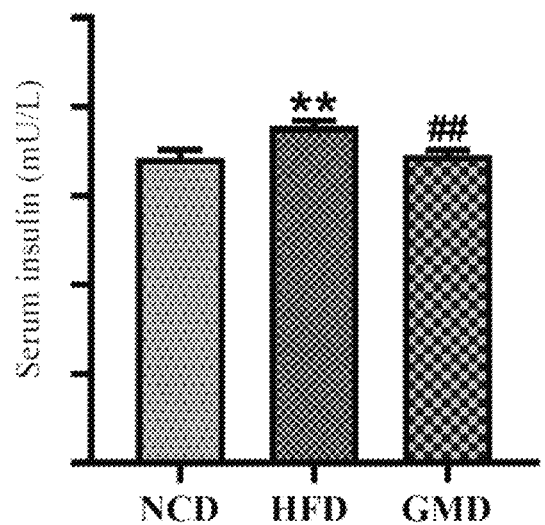
FIG. 2B shows serum insulin levels in HFDt-fed mice after 16 weeks of feeding, and in this figure, * indicates statistical significance compared to the NCD group, #denotes statistical significance compared to the HFD group, ** corresponds to $p<0.01$, and ##corresponds to $p<0.01$.
Figure 2C:
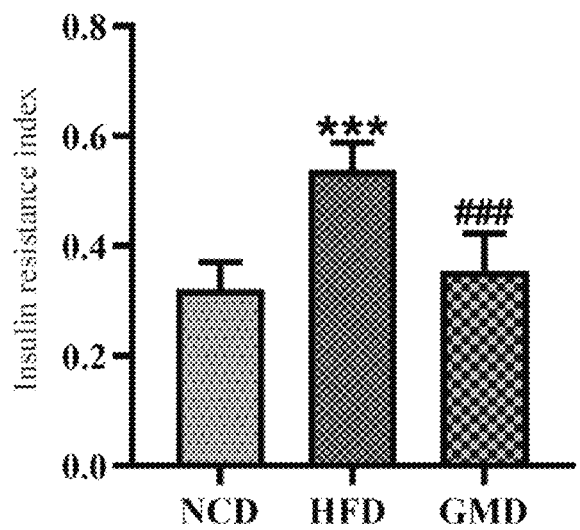
FIG. 2C shows insulin resistance indexes calculated from glucose and insulin levels in HFD-fed mice after 16 weeks of feeding, and in this figure, * indicates statistical significance compared to the NCD group, #denotes statistical significance compared to the HFD group, corresponds to p<0.001, and ###corresponds to p<0.001.
Figure 2D:
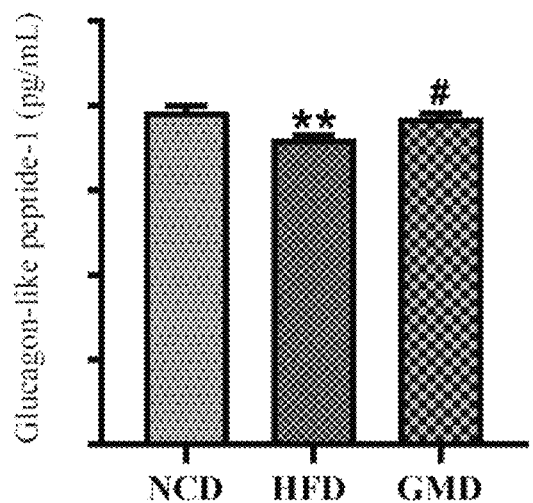
FIG. 2D shows serum GLP-1 levels in HFD-fed mice after 16 weeks of feeding, and in this figure, * indicates statistical significance compared to the NCD group, #denotes statistical significance compared to the HFD group, ** corresponds to p<0.01, and #corresponds to p<0.05.

Compared to the HFD group, the GMD group exhibits significantly decreased serum glucose levels, serum insulin levels, and insulin resistance index (FIGS. 2A, 2B, and 2C), while demonstrating a marked elevation in GLP-1 levels that is comparable to the NCD group (FIG. 2D).

The above results demonstrate that GMD can significantly enhance GLP-1 levels, reduce blood glucose, and ameliorate insulin resistance in HFD-fed mice.

4. Hepatic Gene Expression Analysis

Hepatic gene expression was analyzed by quantitative real-time polymerase chain reaction (qPCR). Total RNA was extracted from liver tissues using Trizol reagent, with RNA concentration and purity determined by a Nanodrop ND-2000 spectrophotometer. Subsequently, RNA was reverse-transcribed into cDNA using a reverse transcription kit from Vazyme Co., Ltd. The expression of GCK, INSR, PEPCK, and G6PC was detected on a LightCycler 480 system with a SYBR qPCR master mix from Vazyme Co., Ltd. The primers used for qPCR are listed in Table 1, and the corresponding results are presented in FIG. 3.

Table 1 Primer sequences for qPCR

TABLE 1

Primer sequences for qPCR

| | Forward Primer (5'→3') | Reverse Primer (5'→3') |
|---|---|---|
| PEPCK | SEQ ID NO: 1<br>TAGGAGCAGCCATGAGAT | SEQ ID NO: 2<br>CGAAGTTGTAGCCGAAGA |
| G6PC | SEQ ID NO: 3<br>TCTGTCCCGGATCTACCTTG | SEQ ID NO: 4<br>GTAGAATCCAAGCGCGAAAC |
| INSR | SEQ ID NO: 5<br>CAGTTTGTGGAACGGTGCTG | SEQ ID NO: 6<br>CATAGGAGCGGCGGATCTTT |
| GCK | SEQ ID NO: 7<br>TCCCTGTAAGGCACGAAGAC | SEQ ID NO: 8<br>ACGATGTTGTTCCCTTCTGC |

Figure 3A:
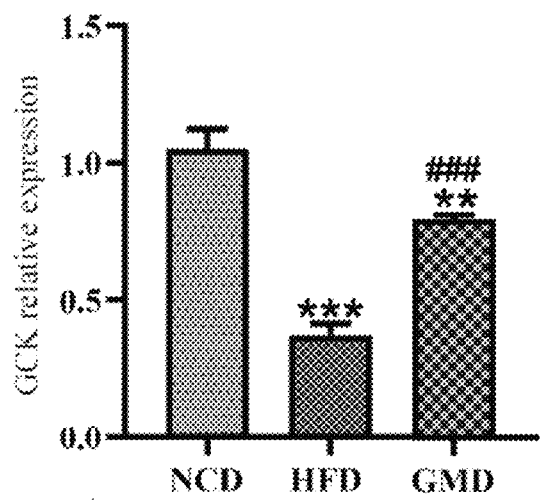
FIG. 3A shows hepatic GCK gene expression in HFD-fed mice after 16 weeks of feeding, and in this figure, * indicates statistical significance compared to the NCD group, #denotes statistical significance compared to the HFD group,  corresponds to p<0.01, * corresponds to p<0.001, and ###corresponds to p<0.001.
Figure 3B:
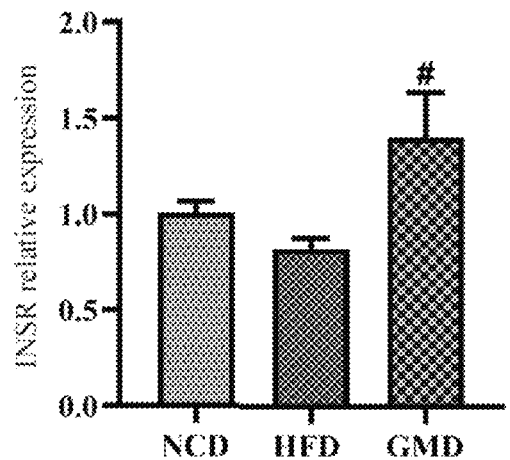
FIG. 3B shows hepatic INSR gene expression in HFD-fed mice after 16 weeks of feeding, and in this figure, * indicates statistical significance compared to the NCD group, #denotes statistical significance compared to the HFD group, and #corresponds to p<0.05.

GCK, the primary rate-limiting enzyme in glucose metabolism, catalyzes the glucose to glucose-6-phosphate (G6P), which serves as an initial step for both glycolysis and glycogen synthesis. Moreover, GCK also functions as a glucose sensor, playing a pivotal role in regulating insulin secretion and maintaining energy homeostasis. As shown in FIG. 3A, hepatic GCK gene expression is significantly decreased in the HFD group compared to the NCD group, whereas GCK expression in the GMD group markedly increases relative to the HFD group, indicating that the GMD intake can enhance glucose metabolism in HFD-fed mice.

The INSR gene is a gene that encodes the insulin receptor, and the insulin receptor is a transmembrane receptor tyrosine kinase that binds to insulin or other ligands, thereby activating the insulin signaling pathway to regulate glucose uptake and release. As demonstrated in FIG. 3B, the GMD group exhibits significantly elevated INSR gene expression compared to the HFD group, indicating that the GMD intake can activate the insulin receptor gene, improving insulin-mediated blood glucose regulation.

Figure 3C:
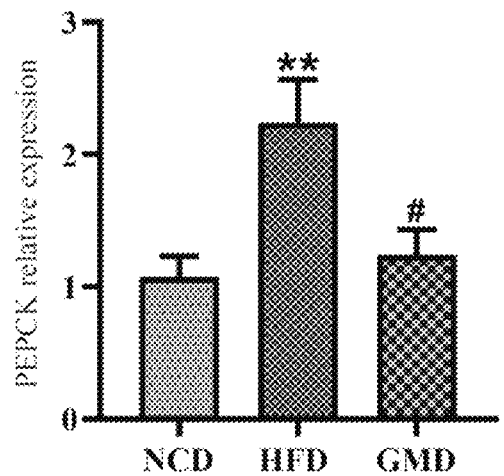
FIG. 3C shows hepatic PEPCK gene expression in HFD-fed mice after 16 weeks of feeding, and in this figure, * indicates statistical significance compared to the NCD group, #denotes statistical significance compared to the HFD group, ** corresponds to p<0.01, and #corresponds to p<0.05.
Figure 3D:
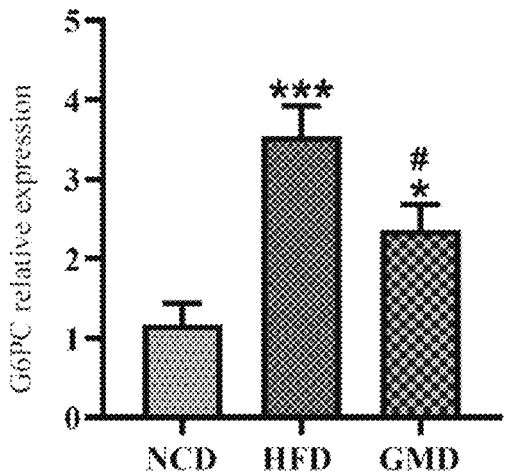
FIG. 3D shows hepatic G6PC gene expression in HFD-fed mice after 16 weeks of feeding, and in this figure, * indicates statistical significance compared to the NCD group, and #denotes statistical significance compared to the HFD group, * corresponds to p<0.05, *** corresponds to p <0.001, and #corresponds to p<0.05.
Figure 4A:
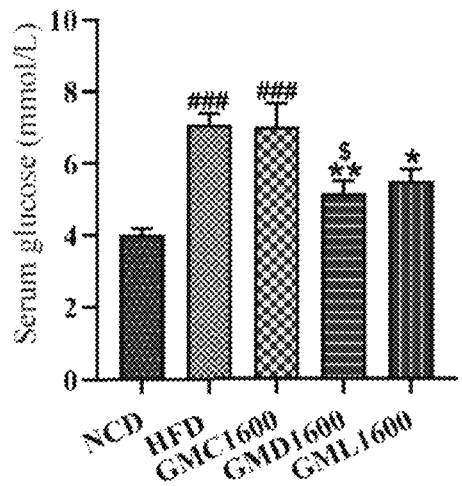
FIG. 4A shows serum glucose levels in HFD-fed mice supplemented with three types of medium chain fatty acid monoglycerides after 16 weeks of feeding, and in this figure, #indicates statistical significance compared to the NCD group, * denotes statistical significance compared to the HFD group, $ represents statistical significance compared to a GMC1600 group, * corresponds to p <0.05, ** corresponds to p<0.01, ###corresponds to p<0.001, and $ corresponds o p<0.05.
Figure 4B:
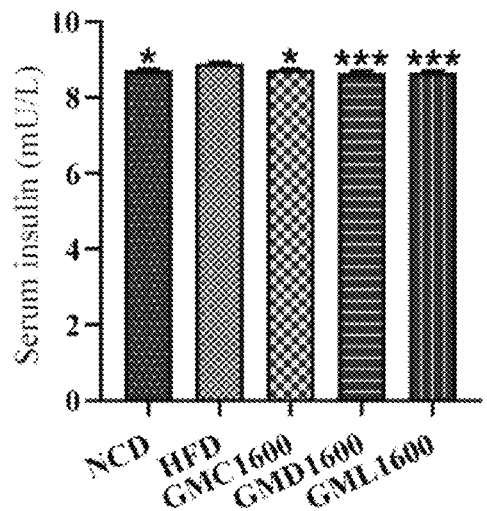
FIG. 4B shows serum insulin levels in HFD-fed mice supplemented with three types of medium chain fatty acid monoglycerides after 16 weeks of feeding, and in this figure, * denotes statistical significance compared to the HFD group, $ represents statistical significance compared to the GMC1600 group, * corresponds to p<0.05,  corresponds to p<0.01, and * corresponds to p<0.001.
Figure 4C:
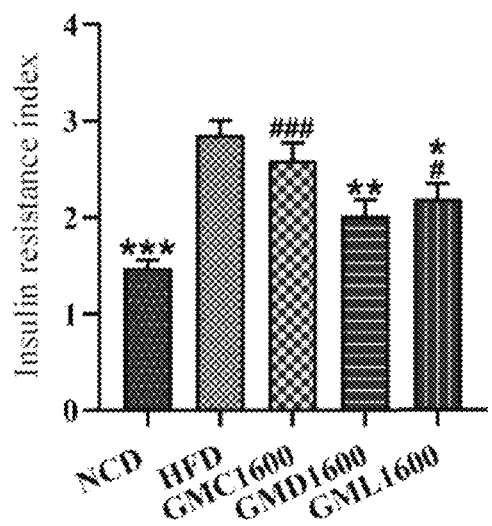
FIG. 4C shows insulin resistance indexes calculated from glucose and insulin levels in HFD-fed mice supplemented with three types of medium chain fatty acid monoglycerides after 16 weeks of feeding, and in this figure, # indicates statistical significance compared to the NCD group, * denotes statistical significance compared to the HFD group, $ represents statistical significance compared to the GMC1600 group, * corresponds to p<0.05,  corresponds to p<0.01, * to p<0.001, #corresponds to p<0.05, and ###corresponds to p<0.001.
Figure 4D:
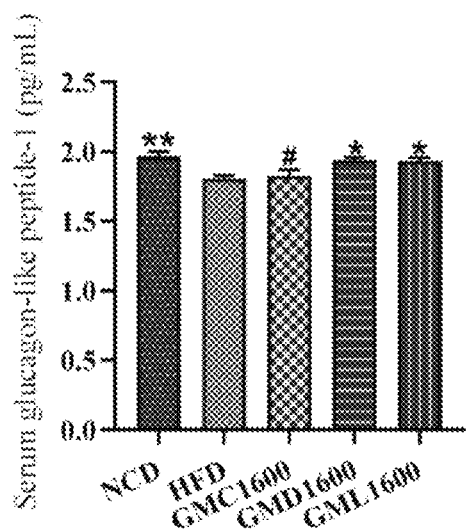
FIG. 4D shows serum GLP-1 levels in HFD-fed mice supplemented with three types of medium chain fatty acid monoglycerides after 16 weeks of feeding, and in this figure, # indicates statistical significance compared to the NCD group, * denotes statistical significance compared to the HFD group, $ represents statistical significance compared to the GMC1600 group, * corresponds to p<0.05, and #corresponds to p<0.05.

The PEPCK gene is a gene encodes PEPCK, and the PEPCK is a vatial enzyme in gluconeogenesis that catalyzes the conversion of oxaloacetate to phosphoenolpyruvate (PEP), thereby driving glucose production. Similarly, the G6PC gene, a key gene in the gluconeogenesis pathway, is responsible for encoding G6P enzymatic subunit, which is a key enzyme in glucose homeostasis. As shown in FIG. 3C and FIG. 3D, the expression levels of both PEPCK and G6PC genes are significantly increased in the HFD group compared to the NCD group, whereas the expression levels of both PEPCK and G6PC genes are markedly reduced in the GMD group relative to the HFD group. These findings collectively suggest that the GMD intake suppresses the experssion of PEPCK and G6PC' in HFD-fed mice, reducing hepatic gluconeogenesis of HFD-fed mice.

Example 2: Effects of Three Medium Chain Fatty Acid Monoglycerides on Blood Glucose Regulation in HFD-Fed Mice 1. Experimental Grouping Sixty 4-week-old healthy male C57BL/6 mice (SPF) from Shanghai Slack Laboratory Animal Co., Ltd. were selected as experimental subjects. After 2 weeks of pre-feeding adaptation, all mice were randomized into three experimental groups. Each group was housed in 5 cages with 4 mice per cage, and maintained for 16 weeks. Detailed groups are as follows:

In an NCD group: normal diet was fed with daily drinking freedom.

In an HFD group: HFD was fed with daily drinking freedom.

In a GMC group: high-fat GMC diet was fed (containing 1600 mg/kg GMC) with daily drinking freedom.

In a GMD group: high-fat GMD diet was fed (containing 1600 mg/kg GMD) with daily drinking freedom.

In a GML group: high-fat GML diet was fed (containing 1600 mg/kg GML) with daily drinking freedom.

2. Serum Index Test

Mice were housed for 16 weeks. At the experimental endpoint, orbital blood sampling was performed to collect serum, followed by euthanasia. Liver tissues were subsequently harvested and snap-frozen for storage.

Serum blood glucose levels were measured using commercial assay kits from Nanjing Jiancheng Bioengineering Institute (China).

Serum insulin and GLP-1 levels were quantified using ELISA kits form Wuhan Colorful Gene Biotech Co., LTD (China). The insulin resistance index was calculated using the following formula: insulin level×blood glucose concentration/22.5.

The results are illustrated in FIG. 4. Compared to the NCD group, the HFD group demonstrates significantly elevated serum glucose levels, serum insulin levels, and insulin resistance index (FIGS. 4A, 4B, and 4C), concomitantly showing a marked reduction in GLP-1 levels (FIG. 4D). These results collectively confirm the successful establishment of a HFD-induced animal model exhibiting hyperglycemia and insulin resistance.

Compared to the HFD group, the GMD group and the GML group exhibit significantly decreased serum glucose levels, serum insulin levels and insulin resistance index (FIGS. 4A, 4B, and 4C), while demonstrating a marked elevation in GLP-1 levels that is comparable to the NCD group (FIG. 4D), in which the GMD group exhibits the strongest effect in reducing blood glucose and insulin resistance index.

The above results demonstrate that GMD can significantly enhance GLP-1 levels, reduce blood glucose, and ameliorate insulin resistance in HFD-fed mice, with effects being the most pronounced among medium chain fatty acid monoglycerides.

Example 3: Effects of GMD on Diabetic Mice

1. A total of 12 C57BLKS/JGpt mice and 36 C57BLKS/JGpt-dbdb mice were selected from GemPharmatech Co., Ltd., in which the C57BLKS/JGpt-dbdb mice are leptin receptor gene-mutated strains derived from C57BLKS/JGpt mice, serving as a typical T2DM research model. After 1 week of pre-feeding adaptation, all mice were randomized into 4 experimental groups. Each group was housed in 3 cages with 4 mice per cage, and maintained for 10 weeks. Detailed groups are as follows:

In a wt/wt group: C57BLKS/JGpt mice were fed normal diet with daily drinking freedom, and received daily oral gavage of control solution (50% PEG400+50% saline, administered at a dosage of 5 mL/kg body weight).

In a db/db group: C57BLKS/JGpt-dbdb mice were fed normal diet with daily drinking freedom, and received daily oral gavage of control solution (50% PEG400+50% saline, administered at a dosage of 5 mL/kg body weight).

In a Metformin group: C57BLKS/JGpt-dbdb mice were fed normal diet with daily drinking freedom, and received daily oral gavage of metformin solution according to a dose of 200 mg/kg body weight (200 mg metformin dissolved in 2.5 mL PEG400+2.5 mL saline, administered at 5 mL/kg body weight).

In a GMD group: C57BLKS/JGpt-dbdb mice were fed normal diet with daily drinking freedom, and received daily oral gavage of metformin solution according to a dose of 160 mg/kg body weight (160 mg GMD suspended in 2.5 mL PEG400+2.5 mL saline, administered at 5 mL/kg body weight).

2. The postprandial blood glucose of the mice was measured regularly every week, and the daily water consumption of the mice was recorded. The results were shown in FIG. 5.

Figure 5A:
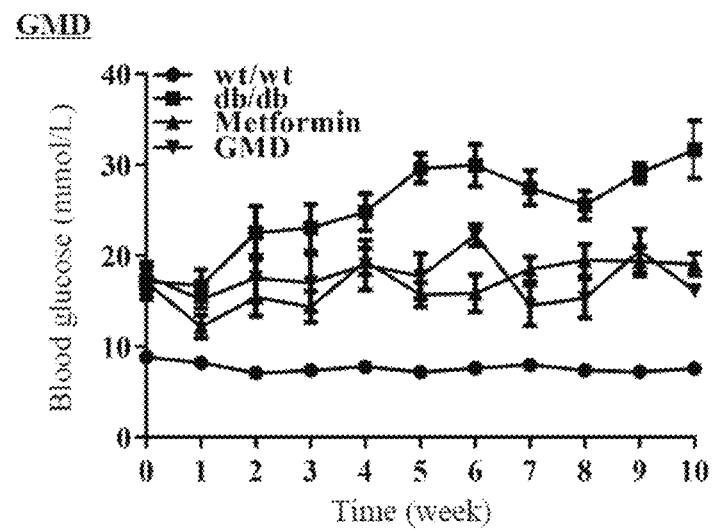
FIG. 5A shows blood glucose variation trends in GMD-fed diabetic mice during 10 weeks of feeding.

As shown in FIG. 5A, during the 10-week feeding period, the db/db group consistently exhibits higher blood glucose levels, with a sustained increasing trend over time. The average blood glucose levels in the later stages exceeds 30 mmol/L. In contrast, both the Metformin group and GMD group demonstrate significantly lower daily blood glucose levels compared to the db/db group, and the blood glucose can remain stable throughout the feeding period. Metformin, a well-known hypoglycemic agent commonly used for T2DM, demonstrates comparable glucose-lowering efficacy to GMD in diabetic mouse models.

Figure 5B:
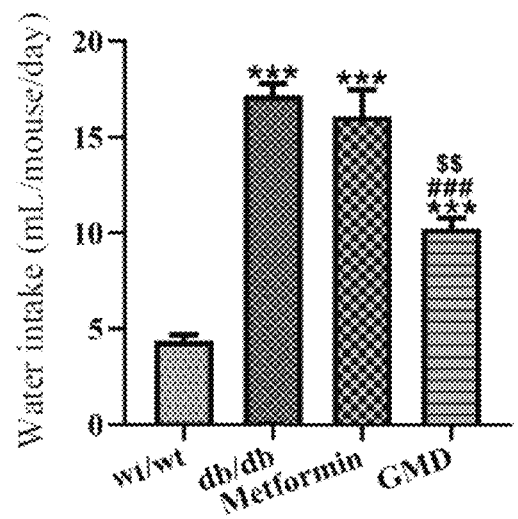
FIG. 5B shows the daily average water intake in GMD-fed diabetic mice during 10 weeks of feeding, and in this figure, * indicates statistical significance compared to a wild-type (wt/wt) group, #denotes statistical significance compared to a diabetic (db/db) group, $ represents statistical significance compared to a metformin (Metformin) group, ** corresponds to p<0.001, ###corresponds to p<0.001, and $$ corresponds to p<0.01.

Diabetic mice typically exhibit a distinct sense of thirst, with an increased water consumption. As shown in FIG. 5B, GMD significantly reduces daily water intake in diabetic mice, suggesting an improvement in diabetic conditions.

3. Glucose Tolerance Test

At week 8, all mice underwent the glucose tolerance test: all mice were fasted for 12 hours prior to receiving an intraperitoneal injection of glucose solution with a dosage of 1.5 g/kg body weight. Blood glucose concentration of each mouse was measured using a glucometer at 0, 30, 60, 90, and 120 minutes, and blood glucose changing curves were plotted to calculate the AUC of blood glucose changes. The results were shown in FIG. 6.

Figure 6A:
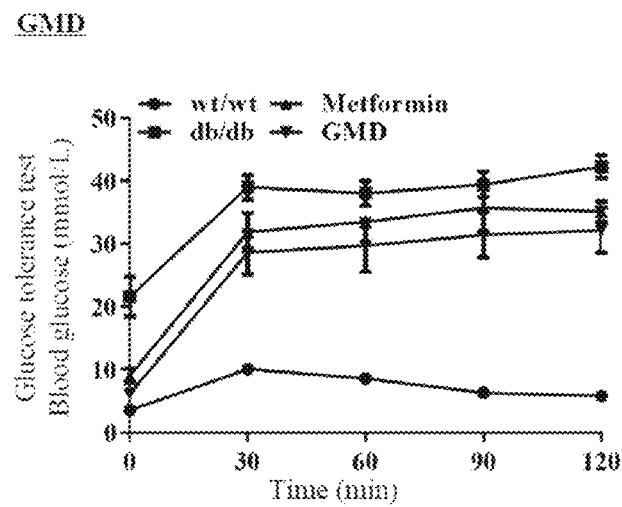
FIG. 6A shows blood glucose curves over 120 minutes following an intraperitoneal glucose injection in GMD-fed diabetic mice at the 8th week of feeding.
Figure 6B:
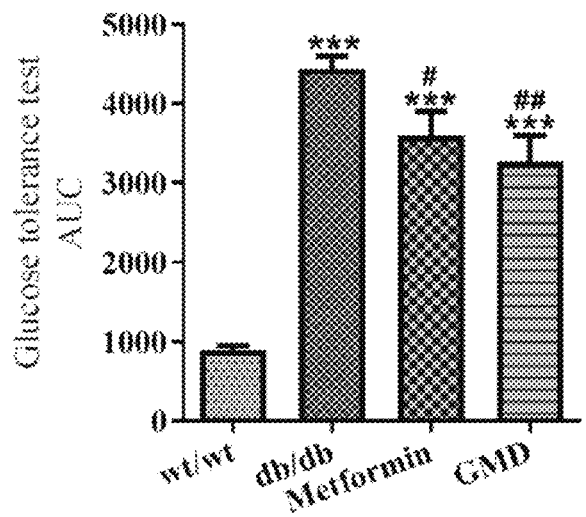
FIG. 6B shows the AUC of blood glucose levels over 120 minutes following an intraperitoneal glucose injection in GMD-fed diabetic mice at the 8th week of feeding, and in this figure, * indicates statistical significance compared to the wt/wt group, #denotes statistical significance compared to the db/db group, *** corresponds to p<0.001, #corresponds to p<0.05, and ##corresponds to p<0.01.

As shown in FIG. 6A, following intraperitoneal injection of glucose solution, blood glucose levels in all mice exhibit an increasing trend within 30 minutes, followed by a gradual decline over the subsequent 90 minutes. Throughout this period, the blood glucose level in the wt/wt group is consistently lower, and both the Metformin and GMD groups maintain blood glucose levels consistently lower than those in the db/db group. Moreover, as shown in FIG. 6B, the Metformin and GMD groups exhibit a significantly smaller AUC in the glucose tolerance test compared to the db/db group, in which the GMD group exhibits the lowest AUC among diabetic mice, surpassing the efficacy observed in the Metformin group.

4. Insulin Tolerance Test

At week 9, all mice underwent the insulin tolerance test: all mice were fasted for 12 hours prior to receiving an intraperitoneal injection of insulin with a dosage of 2 U/kg body weight. Blood glucose concentration of each mouse was measured using a glucometer at 0, 30, 60, 90, and 120 minutes, and blood glucose changing curves were plotted to calculate the AUC of blood glucose changes. The results were shown in FIG. 6.

Figure 6C:
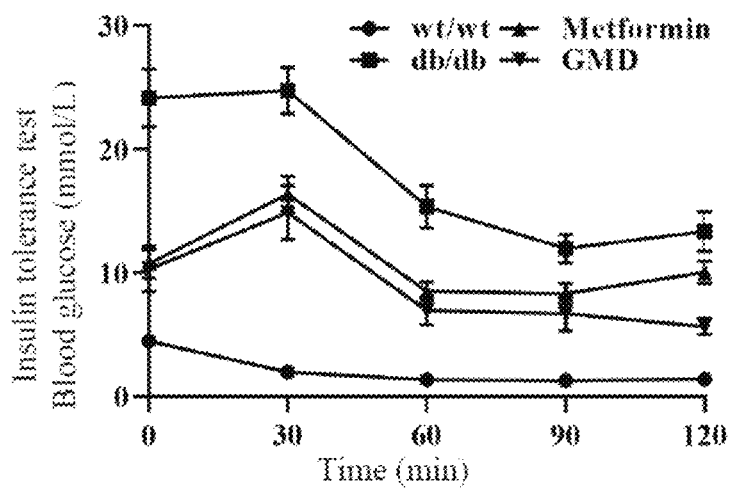
FIG. 6C shows blood glucose curves over 120 minutes following an intraperitoneal insulin injection in GMD-fed diabetic mice at the 9th week of feeding.
Figure 6D:
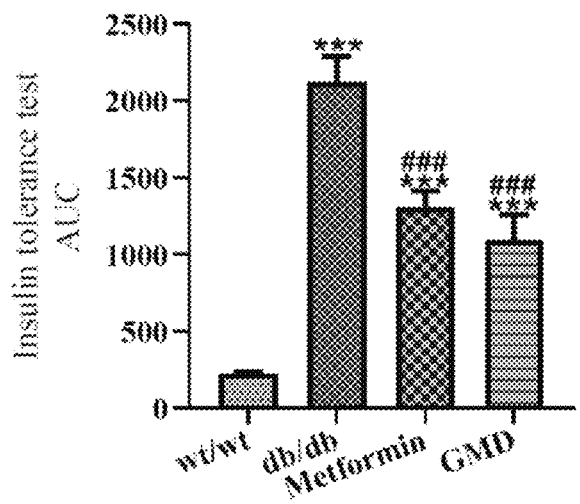
FIG. 6D shows the AUC of blood glucose levels over 120 minutes following an intraperitoneal insulin injection in GMD-fed diabetic mice at the 9th week of feeding, and in this figure, * indicates statistical significance compared to the wt/wt group, #denotes statistical significance compared to the db/db group, *** corresponds to p<0.001, and ###corresponds to p<0.001.

As shown in FIG. 6C, after the intraperitoneal insulin injection, blood glucose levels in diabetic mice exhibit a transient increase followed by a gradual decline. Consistent with the glucose tolerance test results, both the Metformin and GMD groups maintain consistently lower blood glucose levels compared to the db/db group. As shown in FIG. 6D, the AUC of the insulin tolerance test is significantly reduced in the Metformin and GMD groups relative to the db/db group, in which the GMD group demonstrates the lowest AUC among all diabetic mice, surpassing the efficacy of the Metformin group.

Based on the results from the glucose tolerance test and insulin tolerance test, GMD demonstrates significant efficacy in regulating blood glucose levels in diabetic mice, even surpassing the hypoglycemic effects of metformin, a widely used hypoglycemic drug.

5. Effects of GMD on Serum Indexes in Diabetic Mice

After the mice were housed for 10 weeks, orbital blood sampling was performed to collect serum, followed by euthanasia. Liver tissues were subsequently harvested and snap-frozen for storage. Serum blood glucose levels were also measured using commercial assay kits from Nanjing Jiancheng Bioengineering Institute (China). Serum insulin and GLP-1 levels were quantified using ELISA kits form Wuhan Colorful Gene Biotech Co., LTD (China). The insulin resistance index was calculated using the following formula: insulin level×blood glucose concentration/22.5. The results were shown in FIG. 7.

As shown in FIGS. 7A-7D, compared to the db/db group, the serum glucose levels and insulin resistance indexes of the Metformin and GMD groups are significantly reduced, and the GLP-1 levels are significantly increased. In the GMD group, serum insulin level is significantly reduced, and the GLP-1 level is also significantly higher than that of the Metformin group.

The results demonstrate that GMD can significantly enhance GLP-1 levels, reduce blood glucose, and ameliorate insulin resistance in diabetic mice.

6. Detection of Hepatic Gene Expression Analysis

Consistent with the above HFD mouse experiment, qPCR was employed to detect the expression levels of the genes in the liver: GCK, INSR, PEPCK, and G6PC subunit gene.

Figure 8A:
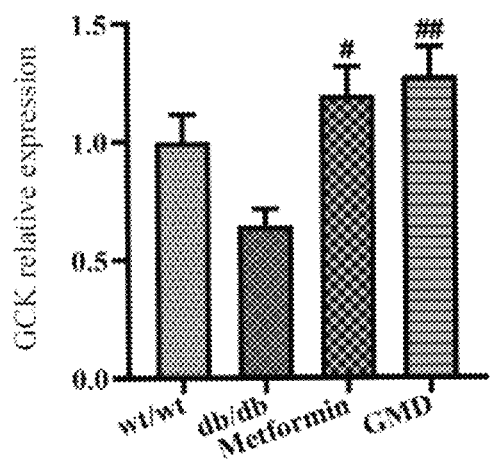
FIG. 8A shows GCK gene expression in GMD-treated diabetic mice after 10 weeks of feeding, and in this figure, #denotes statistical significance compared to the db/db group, #corresponds to $p<0.05$, ##corresponds to $p<0.01$.
Figure 8B:
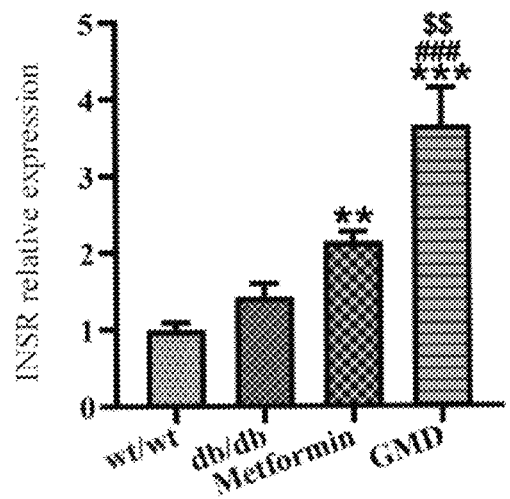
FIG. 8B shows INSR gene expression in GMD-treated diabetic mice after 10 weeks of feeding, and in this figure, * indicates statistical significance compared to the wt/wt group, #denotes statistical significance compared to the db/db group, $ represents statistical significance compared to the Metformin group,  corresponds to $p<0.01$, * corresponds to $p<0.001$, ###corresponds to $p<0.001$, and $$ corresponds to $p<0.01$.
Figure 8C:
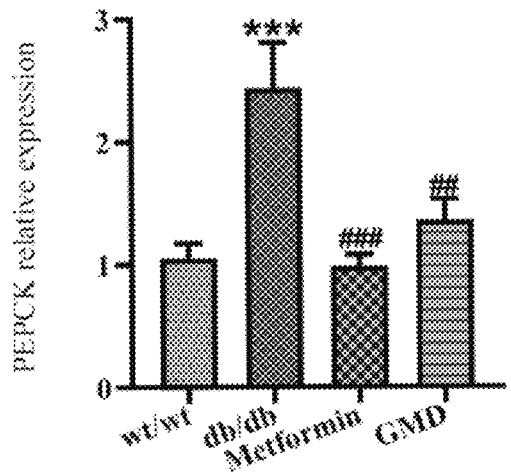
FIG. 8C shows PEPCK gene expression in GMD-treated diabetic mice after 10 weeks of feeding, and in this figure, * indicates statistical significance compared to the wt/wt group, #denotes statistical significance compared to the db/db group, *** corresponds to $p<0.001$, #corresponds to $p<0.05$, ##corresponds to $p<0.01$, and ###corresponds to $p<0.001$.
Figure 8D:
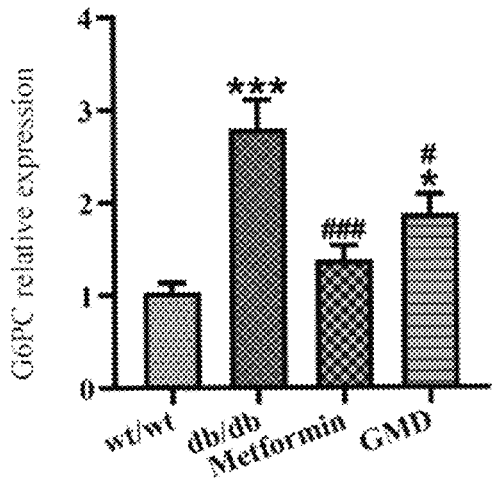
FIG. 8D shows G6P C gene expression in GMD-treated diabetic mice after 10 weeks of feeding, and in this figure, * indicates statistical significance compared to the wt/wt group, #denotes statistical significance compared to the db/db group, * corresponds to $p<0.05$, *** corresponds to $p<0.001$, #corresponds to $p<0.05$, and ###corresponds to $p<0.001$.

As shown in FIG. 8, compared to the db/db group, both the Metformin group and the GMD group exhibit a significant increase in the expression of the glycolytic gene GCK (FIG. 8A), and the GMD group demonstrates a marked elevation in INSR expression (FIG. 8B). Meanwhile, compared to the db/db group, both the Metformin group and the GMD group significantly suppress the expression of gluconeogenic genes PEPCK (FIG. 8C) and G6PC (FIG. 8D).

The results demonstrate that GMD can significantly promote hepatic glycolysis, activate the expression of insulin receptor genes, and suppress the expression of gluconeogenesis-related genes in diabetic mice, thereby effectively reducing blood glucose levels.

Comparative Example 1: Effects of GML on Diabetic Mice

1. A total of 12 C57BLKS/JGpt mice and 36 C57BLKS/JGpt-dbdb mice were selected from GemPharmatech Co., Ltd. After 1 week of pre-feeding adaptation, all mice were randomized into 4 experimental groups. Each group was housed in 3 cages with 4 mice per cage, and maintained for 9 weeks. Detailed groups are as follows:

In wt/wt group: normal diet were fed with daily drinking freedom, and received daily oral gavage of control solution (50% PEG400+50% saline, administered at a dosage of 5 mL/kg body weight).

In db/db group: normal diet were fed with daily drinking freedom, and received daily oral gavage of control solution (50% PEG400+50% saline, administered at a dosage of 5 mL/kg body weight).

In Metformin group (db/db+Metform in): normal diet were fed with daily drinking freedom, and received daily oral gavage of metformin solution according to a dose of 200 mg/kg body weight (200 mg metformin dissolved in 2.5 mL PEG400+2.5 mL saline, administered at 5 mL/kg body weight).

In GML group: normal diet were fed with daily drinking freedom, and received daily oral gavage of metformin solution according to a dose of 160 mg/kg body weight (160 mg GML suspended in 2.5 mL PEG400+2.5 mL saline, administered at 5 mL/kg body weight).

2. The postprandial blood glucose of the mice was measured regularly every week, and the daily water consumption of the mice was recorded. The results were shown in FIG. 5.

Figure 5C:
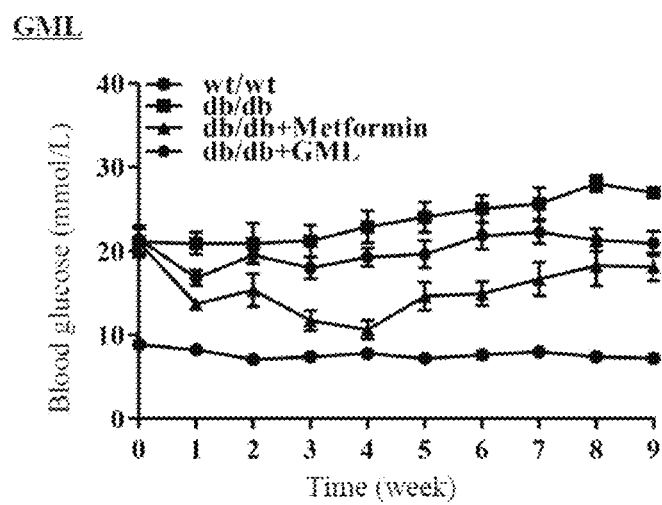
FIG. 5C shows blood glucose variation trends in GML-fed diabetic mice during 10 weeks of feeding.
Figure 5D:
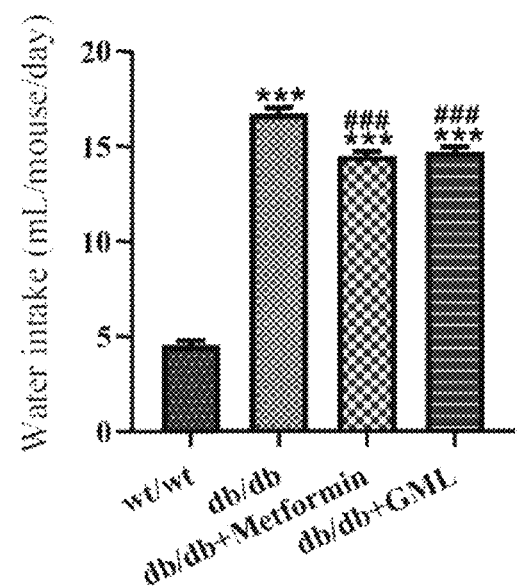
FIG. 5D shows the daily average water intake in GML-fed diabetic mice during 10 weeks of feeding, and in this figure, * indicates statistical significance compared to the wt/wt group, #denotes statistical significance compared to the db/db group, *** corresponds to p<0.001, and ###corresponds to p<0.001.

As shown in FIG. 5C, during the 9-week feeding period, the db/db group consistently exhibits higher blood glucose levels, with a sustained increasing trend over the feeding time. Both the Metformin group and the GML group demonstrate significantly lower daily blood glucose levels compared to the db/db group. As shown in FIG. 5D, GML significantly reduces daily water intake in diabetic mice, suggesting an improvement in diabetic conditions.

The results reveal that GML can improve daily blood glucose levels and reduce water intake in diabetic mice, but its efficacy is inferior to metformin. Overall, GML is less effective than GMD in improving blood glucose in diabetic mice.

3. Glucose Tolerance Test

At week 7, all mice underwent the glucose tolerance test: all mice were fasted for 12 hours prior to receiving an intraperitoneal injection of glucose solution with a dosage of 1.5 g/kg body weight. Blood glucose concentration of each mouse was measured using a glucometer at 0, 30, 60, 90, and 120 minutes, and blood glucose changing curves were plotted to calculate the AUC of blood glucose changes. The results were shown in FIG. 6.

Figure 6E:
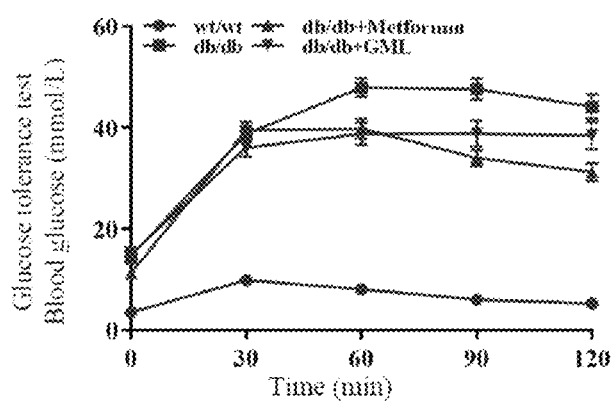
FIG. 6E shows blood glucose curves over 120 minutes following an intraperitoneal glucose injection in GML-fed diabetic mice at the 8th week of feeding.
Figure 6F:
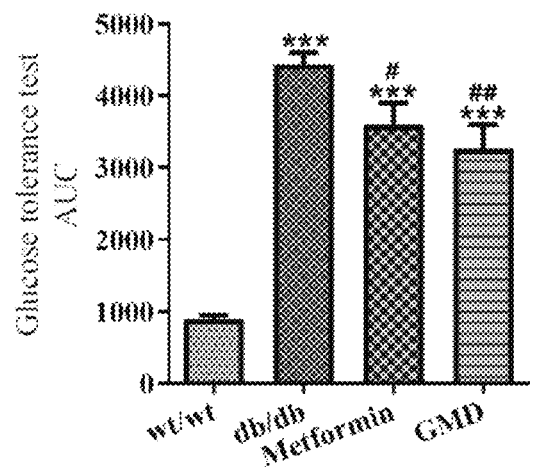
FIG. 6F shows the AUC of blood glucose levels over 120 minutes following an intraperitoneal glucose injection in GML-fed diabetic mice at the 8th week of feeding, and in this figure, * indicates statistical significance compared to the wt/wt group, #denotes statistical significance compared to the db/db group, *** corresponds to p<0.001, ##corresponds to p<0.01, and ###corresponds to p<0.001.

As shown in FIG. 6E, after the intraperitoneal injection of glucose solution, blood glucose levels in all mice exhibit an increasing trend within 30 minutes, During the subsequent 90 minutes, both the Metformin and GMD groups consistently maintain lower blood glucose levels compared to the db/db group. As shown in FIG. 6F, the Metformin and GMD groups exhibit a significantly smaller AUC in the glucose tolerance test compared to the db/db group, with the Metformin group showing the lowest AUC among all diabetic mice.

4. Insulin Tolerance Test

At week 8, all mice underwent the insulin tolerance test: all mice were fasted for 12 hours prior to receiving an intraperitoneal injection of insulin with a dosage of 2 U/kg body weight. Blood glucose concentration of each mouse was measured using a glucometer at 0, 30, 60, 90, and 120 minutes, and blood glucose changing curves were plotted to calculate the AUC of blood glucose changes. The results were shown in FIG. 6.

Figure 6G:
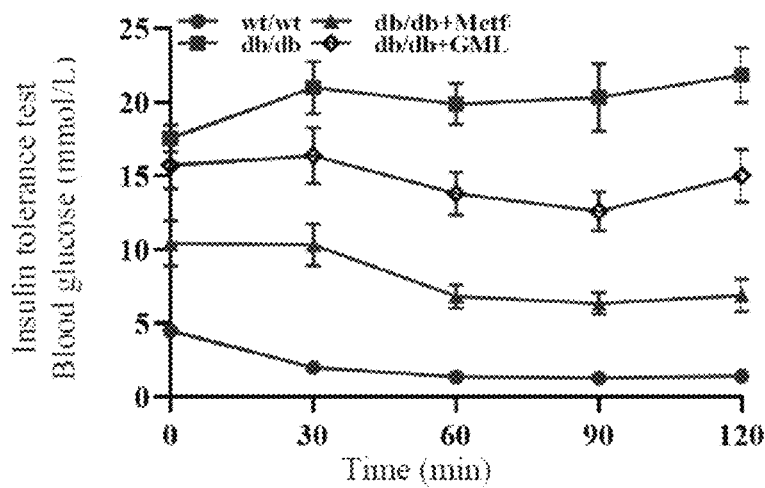
FIG. 6G shows blood glucose curves over 120 minutes following an intraperitoneal insulin injection in GML-fed diabetic mice at the 9th week of feeding.
Figure 6H:
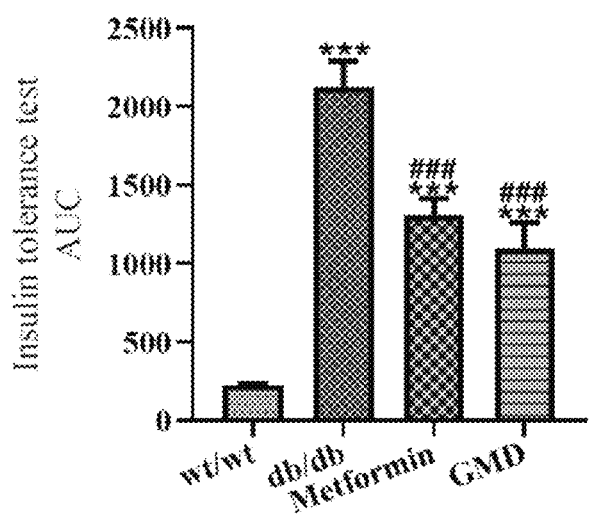
FIG. 6H shows the AUC of blood glucose levels over 120 minutes following an intraperitoneal insulin injection in GML-fed diabetic mice at the 9th week of feeding, and in this figure, * indicates statistical significance compared to the wt/wt group, #denotes statistical significance compared to the db/db group, *** corresponds to p<0.001, and ###corresponds to p<0.001.
Figure 7A:
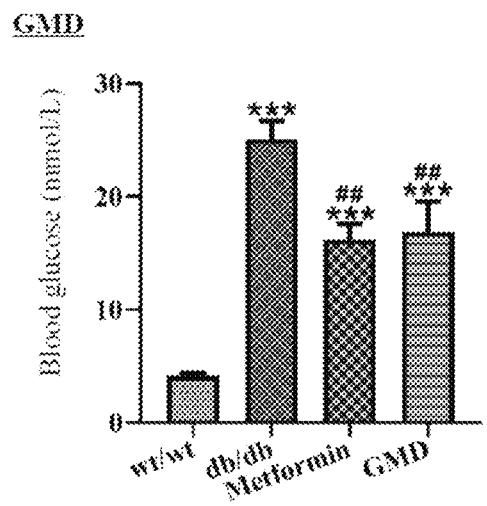
FIG. 7A shows serum glucose levels in GMD-fed diabetic mice after 10 weeks of feeding, and in this figure, * indicates statistical significance compared to the wt/wt group, #denotes statistical significance compared to the db/db group, *** corresponds to p<0.001, and ##corresponds to p<0.01.
Figure 7B:
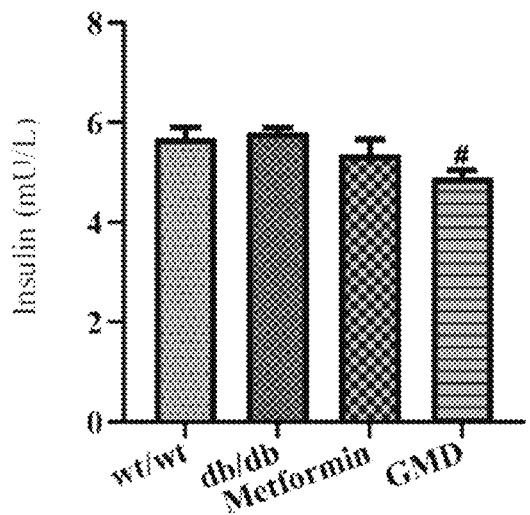
FIG. 7B shows serum insulin levels in GMD-fed diabetic mice after 10 weeks of feeding, and in this figure, #denotes statistical significance compared to the db/db group, and #corresponds to p<0.05.
Figure 7C:
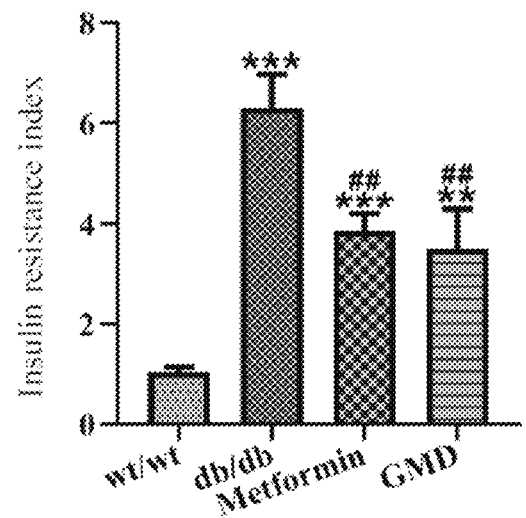
FIG. 7C shows insulin resistance indexes calculated from glucose and insulin levels in GMD-fed diabetic mice after 10 weeks of feeding, and in this figure, * indicates statistical significance compared to the wt/wt group, #denotes statistical significance compared to the db/db group,  corresponds to $p<0.01$, * corresponds to $p<0.001$, and ##corresponds to $p<0.01$.
Figure 7D:
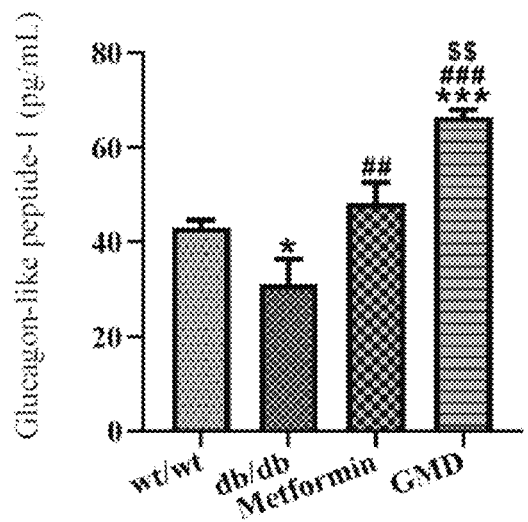
FIG. 7D shows serum GLP-1 levels in GMD-fed diabetic mice after 10 weeks of feeding, and in this figure, * indicates statistical significance compared to the wt/wt group, #denotes statistical significance compared to the db/db group, $ represents statistical significance compared to the Metformin group, * corresponds to $p<0.05$, *** corresponds to $p<0.001$, ##corresponds to $p<0.01$, ###corresponds to $p<0.001$, and $$ corresponds to $p<0.01$.
Figure 7E:
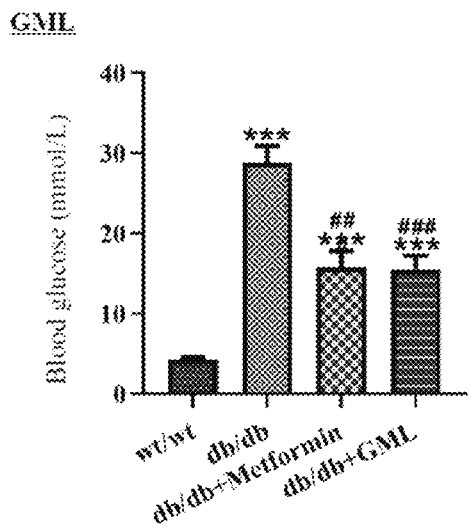
FIG. 7E shows serum glucose levels in GML-fed diabetic mice after 10 weeks of feeding, and in this figure, * indicates statistical significance compared to the wt/wt group, #denotes statistical significance compared to the db/db group, *** corresponds to $p<0.001$, ##corresponds to $p<0.01$, and ###corresponds to $p<0.001$
Figure 7F:
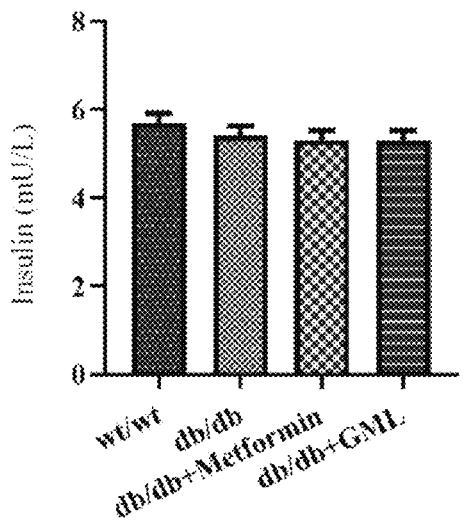
FIG. 7F shows serum insulin levels in GML-fed diabetic mice after 10 weeks of feeding.
Figure 7G:
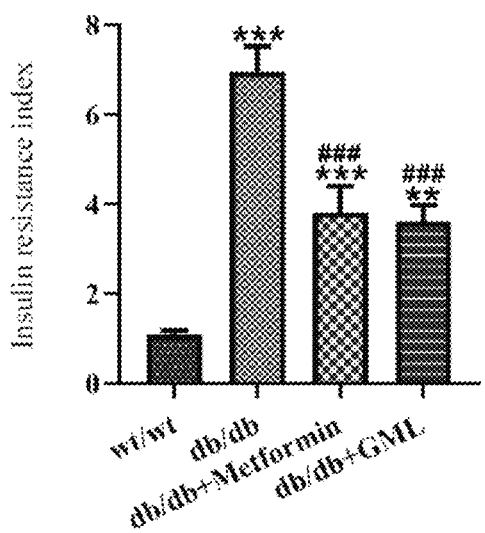
FIG. 7G shows insulin resistance indexes calculated from glucose and insulin levels in GML-fed diabetic mice after 10 weeks of feeding, and in this figure, * indicates statistical significance compared to the wt/wt group, #denotes statistical significance compared to the db/db group, corresponds to $p<0.01$, *** corresponds to $p<0.001$, and ###corresponds to $p<0.001$.
Figure 7H:
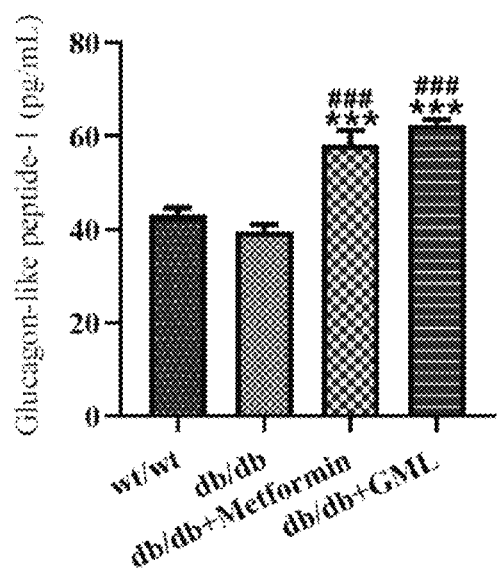
FIG. 7H shows serum GLP-1 levels in GML-fed diabetic mice after 10 weeks of feeding, and in this figure, * indicates statistical significance compared to the wt/wt group, #denotes statistical significance compared to the db/db group, *** corresponds to $p<0.001$, and ###corresponds to $p<0.001$.

As shown in FIG. 6G, after the intraperitoneal insulin injection, the blood glucose of the Metformin group and the GML group was consistently lower than that of the db/db group. As shown in FIG. 6H, the Metformin and GML groups exhibit a significantly smaller AUC in the insulin tolerance test compared to the db/db group, with the Metformin group showing the lowest AUC among all diabetic mice.

Based on the results from the glucose tolerance test and insulin tolerance test, GML demonstrates significant efficacy in regulating blood glucose levels in diabetic mice, but taking the effect of metformin as a reference, its effect on regulating blood glucose in diabetic mice is not as good as GMD.

5. Effects of GML on Serum Indexes in Diabetic Mice

After the mice were housed for 9 weeks, orbital blood sampling was performed to collect serum, followed by euthanasia. Liver tissues were subsequently harvested and snap-frozen for storage. Serum blood glucose levels were also measured using commercial assay kits from Nanjing Jiancheng Bioengineering Institute (China). Serum insulin and GLP-1 levels were quantified using ELISA kits form Wuhan Colorful Gene Biotech Co., LTD (China). The insulin resistance index was calculated using the following formula: insulin level×blood glucose concentration/22.5. The results were shown in FIG. 7.

As shown in FIGS. 7E-7H, compared to the db/db group, the serum glucose levels and insulin resistance indexes of the Metformin and GML groups are significantly reduced, and the GLP-1 levels are significantly increased, in which there was no significant difference in GLP-1 levels between the Metformin group and the GML group.

The results indicate that GML can significantly reduce blood glucose levels, alleviate insulin resistance, and increase GLP-1 levels in diabetic mice. However, its effect on enhancing GLP-1 levels is less pronounced than that of GMD.

The invention claimed is:

1. An application method of glycerol monodecanoate (GMD), comprising:
   administering the GMD to patients with hyperglycemia or diabetes mellitus at an effective dose to thereby treat the hyperglycemia or the diabetes mellitus in the patients; wherein the hyperglycemia refers to insulin resistance-induced hyperglycemia; and the diabetes mellitus refers to type 2 diabetes mellitus (T2DM), with manifestations comprising polydipsia and a significant reduction in serum levels of glucagon-like peptide-1 (GLP-1).

2. The application method according to claim 1, wherein the GMD improves the body's glucose tolerance and insulin tolerance, increases GLP-1 levels, enhances insulin sensitivity, and ameliorates insulin resistance.

3. The application method according to claim 1, wherein the GMD reduces blood glucose levels by promoting the expression of glucokinase (GCK) and insulin receptor (INSR) genes in a hepatic glycolysis pathway, and inhibiting the expression of phosphoenolpyruvate carboxykinase (PEPCK) and glucose-6-phosphatase catalytic (G6PC) subunit genes in a gluconeogenesis pathway.

4. The application method according to claim 1, wherein the administering the GMD to patients with hyperglycemia or diabetes mellitus at an effective dose, comprises:
   orally administering the GMD to the patients with the hyperglycemia or the diabetes mellitus.

5. The application method according to claim 1, further comprising:
   preparing a drug or a functional food using the GMD as an active ingredient; and
   administering the drug or the functional food to the patients to thereby treat the hyperglycemia or the diabetes mellitus in the patients.

* * * * *

SEQUENCE LISTING

```
Sequence total quantity: 8
SEQ ID NO: 1              moltype = DNA   length = 18
FEATURE                   Location/Qualifiers
source                    1..18
                          mol_type = other DNA
                          organism = synthetic construct
SEQUENCE: 1
taggagcagc catgagat                                                         18

SEQ ID NO: 2              moltype = DNA   length = 18
FEATURE                   Location/Qualifiers
source                    1..18
                          mol_type = other DNA
                          organism = synthetic construct
SEQUENCE: 2
cgaagttgta gccgaaga                                                         18

SEQ ID NO: 3              moltype = DNA   length = 20
FEATURE                   Location/Qualifiers
source                    1..20
                          mol_type = other DNA
                          organism = synthetic construct
SEQUENCE: 3
tctgtcccgg atctaccttg                                                       20

SEQ ID NO: 4              moltype = DNA   length = 20
FEATURE                   Location/Qualifiers
source                    1..20
                          mol_type = other DNA
                          organism = synthetic construct
SEQUENCE: 4
gtagaatcca agcgcgaaac                                                       20

SEQ ID NO: 5              moltype = DNA   length = 20
FEATURE                   Location/Qualifiers
source                    1..20
                          mol_type = other DNA
                          organism = synthetic construct
SEQUENCE: 5
cagtttgtgg aacggtgctg                                                       20

SEQ ID NO: 6              moltype = DNA   length = 20
FEATURE                   Location/Qualifiers
source                    1..20
                          mol_type = other DNA
                          organism = synthetic construct
SEQUENCE: 6
cataggagcg gcggatcttt                                                       20

SEQ ID NO: 7              moltype = DNA   length = 20
FEATURE                   Location/Qualifiers
source                    1..20
                          mol_type = other DNA
                          organism = synthetic construct
SEQUENCE: 7
tccctgtaag gcacgaagac                                                       20

SEQ ID NO: 8              moltype = DNA   length = 20
FEATURE                   Location/Qualifiers
source                    1..20
                          mol_type = other DNA
                          organism = synthetic construct
SEQUENCE: 8
acgatgttgt tcccttctgc                                                       20
```